E. PRICE.
SELF ADJUSTING SOLENOID BRAKE.
APPLICATION FILED DEC. 26, 1911.
1,096,454.
Patented May 12, 1914.
2 SHEETS—SHEET 1.
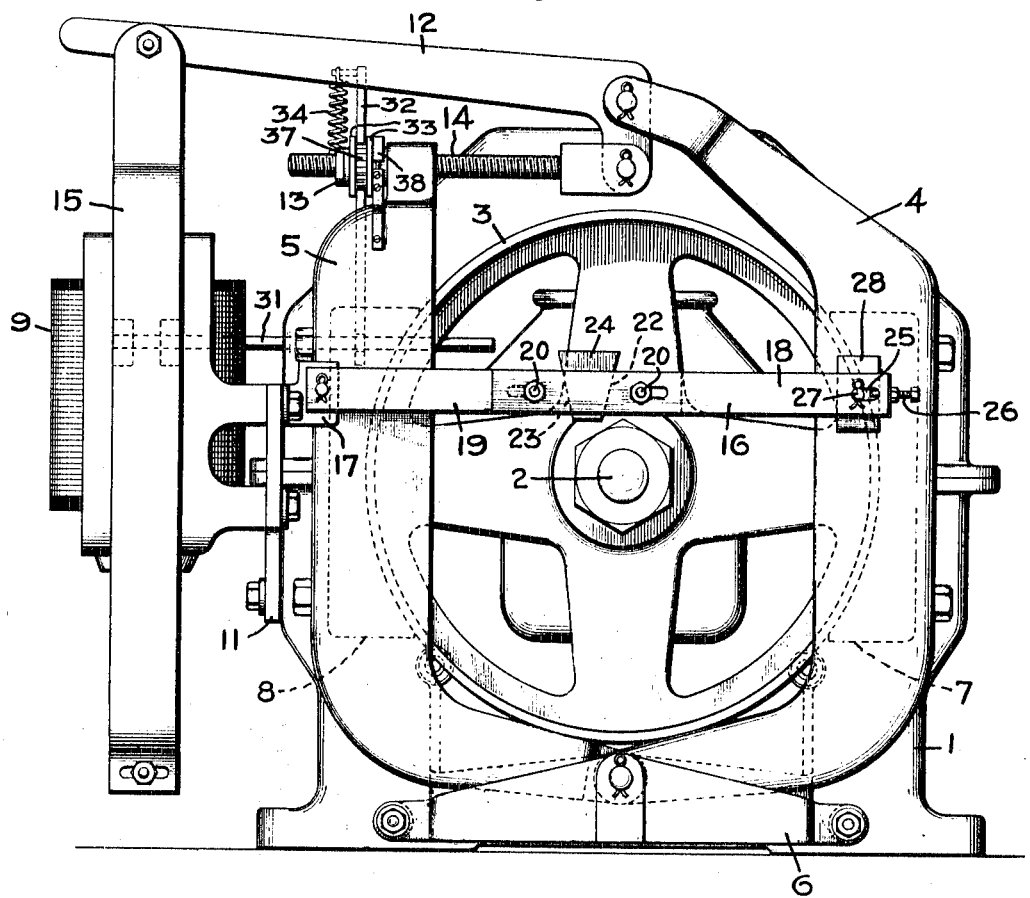
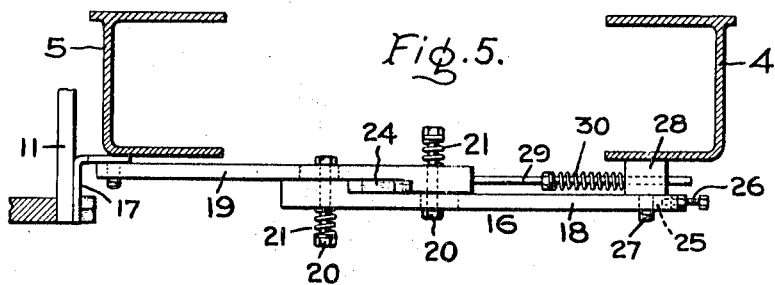
Witnesses:
Marcus L. Byng.
J. Ellis Glen.
Inventor:
Edgar Price,
by: Albert G. Davis
His Attorney.

E. PRICE.
SELF ADJUSTING SOLENOID BRAKE.
APPLICATION FILED DEC. 26, 1911.
1,096,454.
Patented May 12, 1914.
2 SHEETS—SHEET 2.
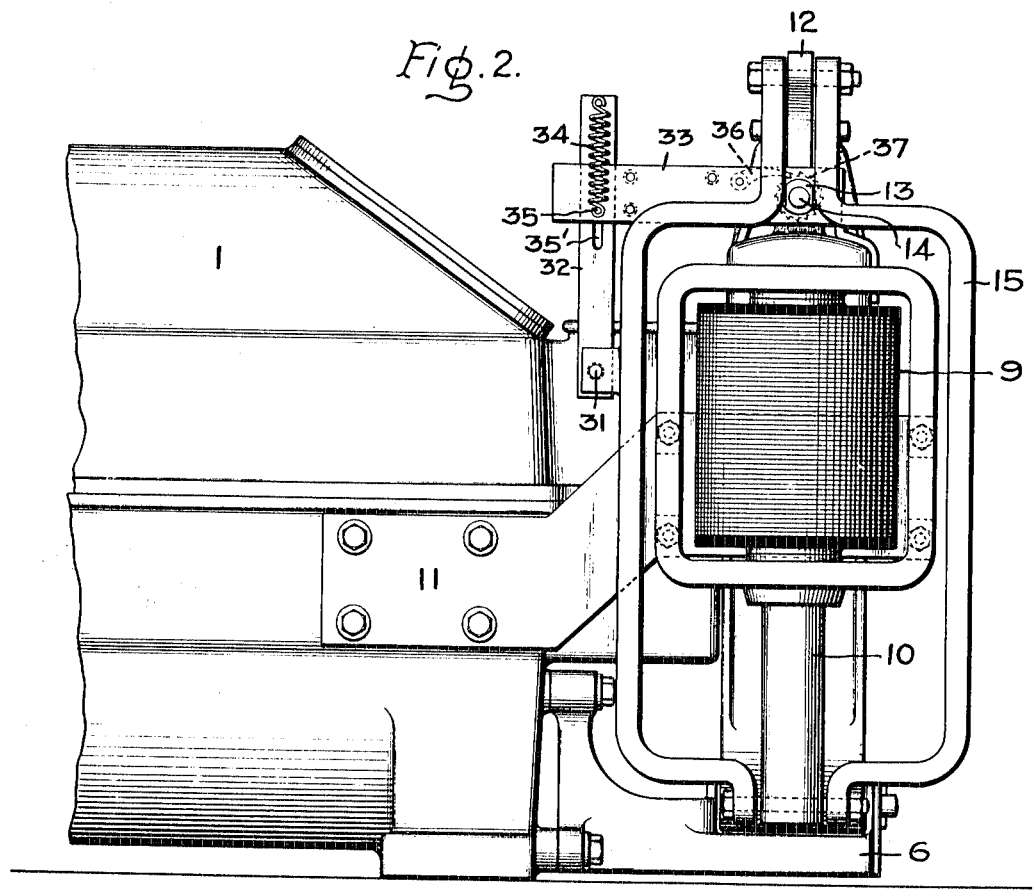
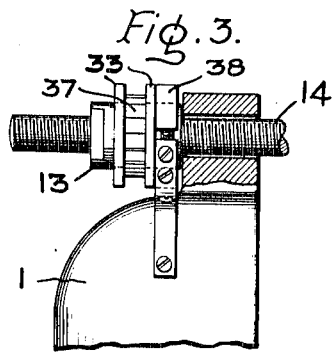
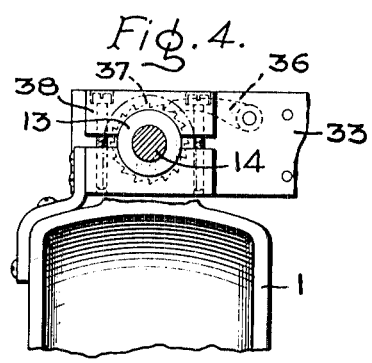
Witnesses:
Marcus L. Byng.
J. Ellis Glen
Inventor:
Edgar Price,
by: O. Austh. Davis
His Attorney.

UNITED STATES PATENT OFFICE.

EDGAR PRICE, OF SCHENECTADY, NEW YORK, ASSIGNOR TO GENERAL ELECTRIC COMPANY, A CORPORATION OF NEW YORK.

SELF-ADJUSTING SOLENOID-BRAKE.

1,096,454.   Specification of Letters Patent.   Patented May 12, 1914.

Application filed December 26, 1911. Serial No. 667,927.

*To all whom it may concern:*

Be it known that I, EDGAR PRICE, a citizen of the United States, residing at Schenectady, county of Schenectady, State of New York, have invented certain new and useful Improvements in Self-Adjusting Solenoid-Brakes, of which the following is a specification.

My invention relates to brakes, particularly to those of the self adjusting type, and has for its object to provide a novel and effective arrangement for compensating for the wear of the brake shoes and also maintaining the path of travel of the brake operating mechanism substantially constant.

My invention consists in the novel construction and arrangement of parts herein shown and described and pointed out with particularity in the claims.

In the accompanying drawings, Figure 1 is a side elevation of my self adjusting brake applied to an electric motor; Fig. 2 is a front elevation of the same, and Figs. 3, 4 and 5 represent details of construction.

Referring to the drawings, 1 is an electric motor having a shaft 2 on which a brake wheel 3 is mounted. Brake arms 4 and 5 are pivoted to a supporting member 6 below the brake wheel, so that the brake is released by gravity. The brake arms have brake shoes 7 and 8, which are shown in dotted lines in Fig. 1. I have shown the operating mechanism for the brake as a solenoid 9 having an armature 10. The solenoid is supported by a bracket 11 which is bolted to the motor frame as is the supporting member 6, so that the motor frame acts as a supporting frame for the parts of the brake. The brake arm 4 is shown as being pivotally connected to an operating lever 12, while the other brake arm 5 is connected to the operating lever by means of a nut 13 on a screw 14. This screw thus acts as a link between the lever 12 and the brake arm 5. The lever 12 is connected to the armature 10 of the solenoid through a member 15 in the form of a yoke. The connection between the yoke and the armature may be a slot and pin connection as shown, for the purpose of permitting the member 15 to move in a vertical direction.

Referring particularly to Figs. 1 and 5, a bar 16 is shown extending approximately diametrically to the brake wheel 3, and pivotally connected at one end to a stationary part 17 fastened to the bracket 11. The other end of the bar 16 has a slot and pin connection with the brake shoe 7 and arm 4. The operative length of the bar 16 is automatically changed upon a relative displacement of the brake wheel 3 and the shoe 7, due to wear. The bar 16 comprises two members 18 and 19 slidable longitudinally on each other. These two members are held together by means of bolts 20, the friction between them being regulated by springs 21 surrounding the bolts and engaging the nuts thereon at one end and the members at the other. The members 18 and 19 have oppositely inclined faces 22 and 23 which are separated upon a relative movement of the members, and which are engaged by a wedge shaped member 24. This wedge shaped member is movable by gravity upon a separation of the inclined faces to fill the space left by the separation. The member 18 has a slot 25, the length of which may be adjusted by means of a set screw 26. A pin 27 engages this slot and is fastened in a block 28 on the brake arm 4. A rod 29 is fastened to the member 19 and has a spring 30 surrounding it, which is compressed between a nut on the rod 29 and the block 28. This spring tends to maintain the clearance between the brake shoe 7 and the brake wheel, when the brake is released, by pressing the pin 27 toward the right hand end of the slot 25. The manner in which the length of the bar 16 is changed as the brake shoe 7 wears, will be hereinafter explained.

The nut 13 on the screw 14 tends to rotate with each actuation of the brake by means of a pawl and ratchet mechanism. The member or yoke 15 has a rod 31 mounted thereon, so that it is movable therewith. A member 32 is slidably mounted on the rod 31 but is movable vertically with it. A ratchet operating arm which I have shown as comprising two members 33 bolted together is connected to the member 32 by means of a spring 34 and carries a pin 35 which enters a slot 35' in the member 32. The arm 33 is movable horizontally with the nut 13, but is rotatable thereon, and carries the pawl 36. This pawl engages with the ratchet 37 on the nut 13. A small band brake 38, shown in detail in Figs. 3 and 4 engages the nut 13 and is secured to the brake arm 5. This band brake is used to adjust the freedom of motion of the nut on the screw. The operative length of the link or screw 14 is automatically changed upon a relative displacement of the brake wheel 3 and brake shoe 8, due to wear, as will be hereinafter explained.

The operation of my brake is as follows: Before current is supplied the solenoid or motor, the air gap of the solenoid is first adjusted to such an amount by means of the nut 13, that the clearance between both the brake shoes 7 and 8 and the brake wheel 3 is of the proper amount. The total clearance is properly divided between the two brake shoes because the spring 30 presses against the block 28 on the brake arm 4 and maintains the clearance of the brake shoe 7. When current is supplied the solenoid 9, its armature 10 rises and with it the yoke 15, which lifts the lever 12, causing the brake arms to fall away from the brake wheel 3 by their own weight. Brake arm 4 will fall away from the brake wheel a distance measured by the length of the slot 25 and then will be stopped from further motion by the bar 16. Brake arm 5 moves away from the brake wheel a corresponding amount due to the horizontal motion of the screw 14 when the lever 12 moves upward, gravity keeping the arm 5 in contact with the nut 13. After repeated applications of the brake the brake shoes wear away. When brake shoe 7 has worn a small amount, so that when the pin 27 engages the bar at the left hand end of slot 25, the pin presses against the bar at this end of the slot with sufficient force to overcome the friction between the members 18 and 19 and thus slide them upon one another to shorten the bar 16. This movement of the members 18 and 19 separates the inclined faces 22 and 23 thereof and the wedge-shaped member 24 is moved by gravity to fill the space left by the separation of the inclined faces. In this way the bar 16 is shortened and the slack of the brake arm 4 compensated for and also the total clearance between both brake shoes and the brake wheel is properly divided. The movement of the pin 27 to the other end of the slot when the brake is released can not lengthen the bar 16, because the wedge 24 prevents the members 18 and 19 from being pulled in the direction to lengthen the bar. When yoke 15 is pulled upward by the armature 10 of the solenoid, pin 31 moves with it, as does the member 32 as above described. The movement of member 32 acts through spring 34 to turn the ratchet operating arm 33 through a small arc which is less than that of one tooth on the ratchet 37. As brake shoe 7 is worn, the pin which connects brake arm 4 to the lever 12 moves in an arc of a circle as this brake arm revolves about its pivot. This movement of brake arm 4 when the brake is applied causes brake lever 12 to recede, inclining the portion of the lever which is shown in Fig. 1 as extending vertically. Repeated applications of the brake shoes to the wheel 3 cause the shoes wear, and the lever 12 will allow the yoke 15 together with the rod 31, to assume a position below their normal positions when the solenoid is deënergized, thereby increasing the initial air gap of the solenoid. But as the rod 31 and the member 32 assume this lower position, the ratchet operating arm is given a downward rotary motion carrying with it pawl 36, which in turn now engages with another tooth on the ratchet. Until the yoke 15 is lowered enough to allow the pawl to gain hold of a new tooth, it will work back and forth in the one previously engaged with. When pawl 36 catches hold of a new tooth upon the next upward movement of the lever 12, the member 32 stretches the spring 34 which pulls the ratchet operating arm 33 upward, thus causing the pawl 36 to turn the ratchet 37. Since the ratchet is on the nut 13, this nut is screwed along the screw 14, thereby taking up the slack of the brake arm 5 caused by the wear of the shoe 8, so that when next the solenoid is deënergized, the yoke 15 will fall back only to its normal position. This prevents an undue travel of the yoke and also of the armature 10. Spring 34 provides a yielding connection between the member 32 and the ratchet operating arm 33 so that when the pawl 36 has just engaged a new tooth as above described, it will not be necessary to turn the ratchet and consequently nut 13 when the solenoid is next energized during the first part of its upward movement. At this time, the nut 13 is pressed tightly against the brake arm 5 and the brake shoe 8 is pressed tightly against the brake wheel 3. Spring 34 yields until the armature 10 has moved upwardly sufficiently to relieve the pressures between the nut 13 and the brake arm 5 and between the brake shoe 8 and the brake wheel. The spring then contracts, moves the ratchet operating arm 33 with the movement of the member 32 and turns the ratchet 37.

I desire it to be understood that my invention is not limited to the particular construction shown and described, and I aim in the appended claims to cover all modifications which do not depart from the spirit and scope of my invention.

What I claim as new and desire to secure by Letters Patent of the United States, is:—

1. In combination, a brake wheel, a brake shoe therefor, and means for compensating for the wear of said brake shoe comprising a stationary part, a bar connected to said stationary part and having a slot and pin connection with said shoe, and means for changing the operative length of said bar upon the engagement of said pin with said bar at one end of said slot.

2. In combination, a brake wheel, an arm, a brake shoe on said arm, and means for compensating for the wear of said brake shoe comprising a stationary part, a bar connected to said stationary part and having a slot and pin connection with said arm, said bar extending approximately diametrically to said brake wheel, and means for changing the operative length of said bar upon the engagement of said pin with said bar at one end of said slot.

3. In combination, a brake wheel, a brake shoe therefor, means for compensating for the wear of said brake shoe comprising a stationary part, a bar connected to said stationary part and having a slot and pin connection with said shoe, and automatic means operative upon a relative displacement of said brake wheel and shoe, due to wear, for changing the operative length of said bar upon the engagement of said pin with said bar at one end of said slot.

4. In combination, a brake wheel, an arm, a brake shoe on said arm, and means for compensating for the wear of said brake shoe comprising a stationary part, a bar connected to said stationary part and having a slot and pin connection with said arm, said bar extending approximately diametrically to said brake wheel, and automatic means operative upon a relative displacement of said brake wheel and shoe, due to wear, for changing the operative length of said bar upon the engagement of said pin with said bar at one end of said slot.

5. In combination, a brake wheel, a brake shoe therefor, and means compensating for the wear of said brake shoe including a bar having a slot and pin connection with said shoe and comprising two members capable of longitudinal sliding motion on each other, means for holding said bars together, and automatic means operative upon a relative displacement of said brake wheel and shoe, due to wear, for changing the operative length of said bar by sliding said members on each other upon the engagement of said pin with said bar at one end of said slot.

6. In combination, a brake wheel, a brake shoe therefor, and means for compensating for the wear of said brake shoe comprising a stationary part, a bar connected to said stationary part and having a slot and pin connection with said shoe, said bar comprising two members capable of longitudinal sliding motion on each other, means for holding said members together, and automatic means operative upon a relative displacement of said brake wheel and shoe, due to wear, for changing the operative length of said bar by sliding said members on each other upon the engagement of said pin with said bar at one end of said slot.

7. In combination, a brake wheel, a brake shoe therefor, and means for compensating for the wear of said brake shoe including two members capable of longitudinal sliding motion on each other, means for holding said members together, said members having oppositely inclined faces which are separated upon a relative motion of said members, and a wedge shaped member engaging said inclined faces and movable upon a separation thereof to fill the space left by said separation.

8. In combination, a brake wheel, a brake shoe therefor, and means for compensating for the wear of said brake shoe comprising a stationary part, a bar connected to said stationary part and having a slot and pin connection with said shoe, said bar comprising two members capable of longitudinal sliding motion on each other, means for holding said members together, said members having oppositely inclined faces which are separated upon a relative motion of said members, and a wedge shaped member engaging said inclined faces and movable upon the separation thereof to fill the space left by said separation.

9. In combination, a brake wheel, a brake arm, a brake shoe on said arm, an operating lever, an adjusting screw forming a link between the operating lever and said brake arm, a rotatable means connecting said adjusting screw and the brake arm adapted on rotation to change the operative length of the link, and means including a pawl and ratchet mechanism tending with each actuation of the brake shoe to rotate the rotatable means.

10. The combination with a brake having brake arms and shoes, of an operating lever, an adjustable screw between said operating lever and one of said brake arms, a nut on said screw connecting the screw to said brake arm, a member movable with said operating lever, a ratchet operating arm connected to said member, and a pawl and ratchet connection between the ratchet arm and said nut.

11. The combination with a brake having brake arms and shoes, of an operating lever, an adjusting screw between said operating lever and one of said brake arms, a nut on said screw connecting the screw to said brake arm, operating mechanism for said brake, a member connecting said lever with said operating mechanism, a rod fastened to said member, a second member slidable on but movable with said rod, a ratchet operating arm connected to said second member, and a pawl and ratchet connection between the ratchet arm and said nut.

12. The combination with a brake having brake arms and shoes, of an operating lever, an adjusting screw between said operating lever and one of said brake arms, a nut on said screw connecting the screw to said brake arm, a member movable with said operating lever, a ratchet operating arm having a spring connection with said member, and a pawl and ratchet connection between the ratchet arm and said nut.

13. The combination with a brake having brake arms and shoes, of an operating lever, an adjusting screw between said operating lever and one of said brake arms, a nut on said screw connecting the screw to said brake arm, operating mechanism for said brake, a member connecting said lever with said operating mechanism, a rod fastened to said member, a second member slidable on but movable with said rod, a ratchet operating arm having a spring connection with said second member, and a pawl and ratchet connection between the ratchet arm and said nut.

14. In combination, a supporting frame, a plurality of brake shoe arms pivoted on said frame, brake shoes on said arms, a brake wheel, a brake lever connected to said arms, operating mechanism for the brake arms connected to said lever, automatic slack adjusting means between said frame and one of said arms, and separate automatic slack adjusting means between the other of said arms and said lever.

15. In combination, a supporting frame, a plurality of brake shoe arms pivoted on said frame, brake shoes on said arms, a brake wheel, a brake lever connected to said arms, operating mechanism for the brake arms connected to said lever, a bar connected to said frame and having a slot and pin connection with one of said arms, and automatic means operative upon a relative displacement of said brake wheel and shoe, due to wear, for changing the operative length of said bar, and separate automatic means between the other of said arms and said lever, operative upon a relative displacement of said brake wheel and said other shoe, due to wear, for maintaining the path of travel of said brake operating mechanism substantially constant.

In witness whereof, I have set my hand this 22nd day of December, 1911.

EDGAR PRICE.

Witnesses:
BENJAMIN B. HULL,
HELEN ORFORD.